United States Patent [19]

Baillie

[11] Patent Number: 5,472,274
[45] Date of Patent: Dec. 5, 1995

[54] PITCHER WITH COOLING AND STIRRING STRUCTURES

[76] Inventor: Rosa A. Baillie, 1 Antietam St., Brunswick, Me. 04011

[21] Appl. No.: 304,287

[22] Filed: Sep. 12, 1994

[51] Int. Cl.$^6$ ................... B67D 5/62; B01F 7/00
[52] U.S. Cl. ............. 366/129; 62/457.8; 62/457.2; 222/146.6; 366/147
[58] Field of Search ............ 222/146.6; 62/457.2, 62/457.3, 457.4, 452.8; 366/247, 248, 129, 147, 342, 343

[56] References Cited

U.S. PATENT DOCUMENTS

| | | | |
|---|---|---|---|
| 19,373 | 2/1858 | Ludlow | 62/457.8 X |
| 93,001 | 7/1869 | Pietsch | 62/457.8 X |
| 420,262 | 1/1890 | Boemermann | 366/247 |
| 1,095,517 | 5/1914 | Parshall | 366/147 |
| 1,341,095 | 5/1920 | Wood | 366/147 |
| 2,484,391 | 10/1949 | Treiss, Jr. | 366/247 X |
| 2,766,022 | 10/1956 | Bender | 366/247 |
| 3,059,452 | 10/1962 | Griffin | 62/457.2 |
| 3,205,678 | 9/1965 | Stoner | 62/457.4 |
| 3,704,007 | 11/1972 | Kroeger | 366/248 |
| 3,840,153 | 10/1974 | Devlin | 222/146.6 |
| 4,010,934 | 3/1977 | McCord et al. | 366/247 X |
| 4,460,279 | 7/1984 | Krasney | 366/247 |
| 4,893,940 | 1/1990 | Waisberg | 366/247 |
| 4,946,286 | 8/1990 | Purkapile | 366/247 |
| 5,009,083 | 4/1991 | Spinos et al. | 62/457.3 X |
| 5,129,238 | 7/1992 | Schwartz et al. | 62/457.3 |

FOREIGN PATENT DOCUMENTS

| | | | |
|---|---|---|---|
| 167471 | 5/1934 | Switzerland | 366/247 |

*Primary Examiner*—Kevin P. Shaver

[57] ABSTRACT

A container for cooling and stirring a beverage. The inventive device includes a pitcher for receiving the beverage and a lid removably coupled to a top end of the pitcher. A stirring assembly extends through the lid for reciprocation by an individual to effect agitation and stirring of the beverage. A cooling cylinder assembly for receiving a plurality of ice cubes is mounted to a bottom surface of the lid and extends into contact with the beverage, thereby cooling the beverage without direct immersion of the ice within the beverage.

2 Claims, 4 Drawing Sheets

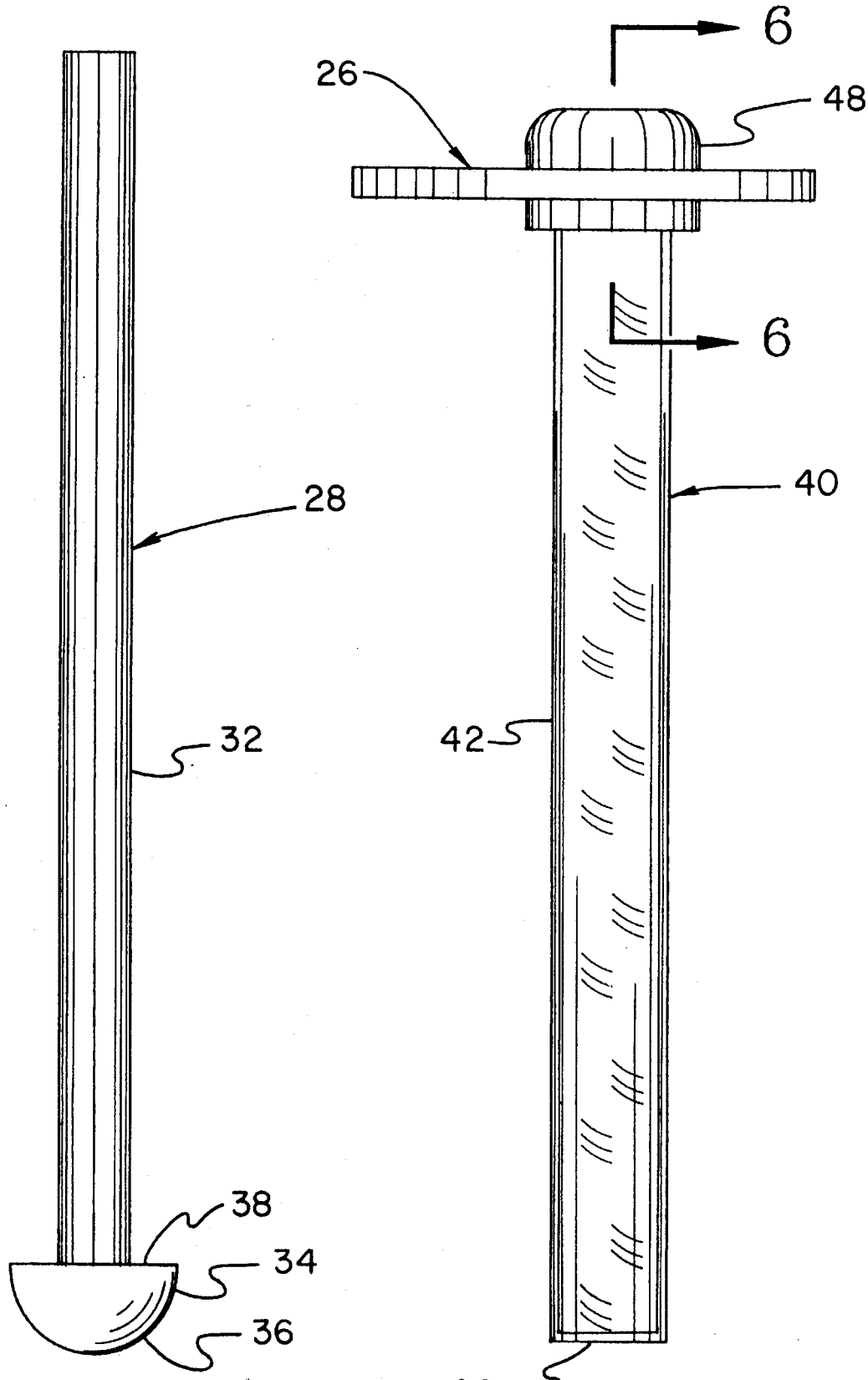

PITCHER WITH COOLING AND STIRRING STRUCTURES

BACKGROUND OF THE INVENTION

1. Field of the Invention

The present invention relates to container structures and more particularly pertains to a refrigerated container for cooling and stirring a beverage.

2. Description of the Prior Art

The use of container structures is known in the prior art. More specifically, container structures heretofore devised and utilized are known to consist basically of familiar, expected and obvious structural configurations, notwithstanding the myriad of designs encompassed by the crowded prior art which have been developed for the fulfillment of countless objectives and requirements.

Known prior art container structures include U.S. Pat. No. 4,655,373; U.S. Pat. No. 3,675,826; U.S. Pat. No. D,243,434; U.S. Pat. No. D,263,546; and U.S. Pat. No. D,337,690.

While these devices fulfill their respective, particular objectives and requirements, the aforementioned patents do not disclose a refrigerated container for cooling and stirring a beverage which includes a pitcher for receiving the beverage, a lid removably coupled to a top end of the pitcher, a stirring rod extending through the lid for reciprocation by an individual to agitate the beverage, and a cooling cylinder mounted to a bottom surface of the lid for receiving a plurality of ice cubes and extending into contact with the beverage. Furthermore, none of the known prior art container structures teach or suggest a refrigerated container of the aforementioned structure which is operable to effect cooling of the beverage without direct immersion of the ice within the beverage.

In these respects, the refrigerated container according to the present invention substantially departs from the conventional concepts and designs of the prior art, and in so doing provides an apparatus primarily developed for the purpose of cooling and stirring a beverage contained therein.

SUMMARY OF THE INVENTION

In view of the foregoing disadvantages inherent in the known types of container structures now present in the prior art, the present invention provides a new refrigerated container construction wherein the same can be utilized for cooling and stirring a beverage. As such, the general purpose of the present invention, which will be described subsequently in greater detail, is to provide a new refrigerated container apparatus and method which has many of the advantages of the container structures mentioned heretofore and many novel features that result in a refrigerated container which is not anticipated, rendered obvious, suggested, or even implied by any of the prior art container structures, either alone or in any combination thereof.

To attain this, the present invention generally comprises a container for cooling and stirring a beverage. The inventive device includes a pitcher for receiving the beverage and a lid removably coupled to a top end of the pitcher. A stirring assembly extends through the lid for reciprocation by an individual to effect agitation and stirring of the beverage. A cooling cylinder assembly for receiving a plurality of ice cubes is mounted to a bottom surface of the lid and extends into contact with the beverage, thereby cooling the beverage without direct immersion of the ice within the beverage.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new refrigerated container apparatus and method which has many of the advantages of the container structures mentioned heretofore and many novel features that result in a refrigerated container which is not anticipated, rendered obvious, suggested, or even implied by any of the prior art container structures, either alone or in any combination thereof.

It is another object of the present invention to provide a new refrigerated container which may be easily and efficiently manufactured and marketed.

It is a further object of the present invention to provide a new refrigerated container which is of a durable and reliable construction.

An even further object of the present invention is to provide a new refrigerated container which is susceptible of a low cost of manufacture with regard to both materials and labor, and which accordingly is then susceptible of low prices of sale to the consuming public, thereby making such refrigerated containers economically available to the buying public.

Still yet another object of the present invention is to provide a new refrigerated container which provides in the apparatuses and methods of the prior art some of the advantages thereof, while simultaneously overcoming some of the disadvantages normally associated therewith.

Still another object of the present invention is to provide a new refrigerated container for cooling and stirring a beverage contained therewithin.

Yet another object of the present invention is to provide a new refrigerated container which includes a pitcher receiving the beverage, a lid removably coupled to a top end of the pitcher, a stirring rod extending through the lid for reciprocation by an individual to agitate the beverage, and a cooling cylinder mounted to a bottom surface of the lid for receiving a plurality of ice cubes and extending into contact with the beverage.

Even still another object of the present invention is to provide a new refrigerated container for cooling a beverage without direct immersion of ice within the beverage.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a side elevation view of a stirring means comprising a portion of the present invention.

FIG. 5 is a side elevation view of a cooling means comprising a further portion of the present invention.

DESCRIPTION OF THE PREFERRED EMBODIMENT

Figure 1:
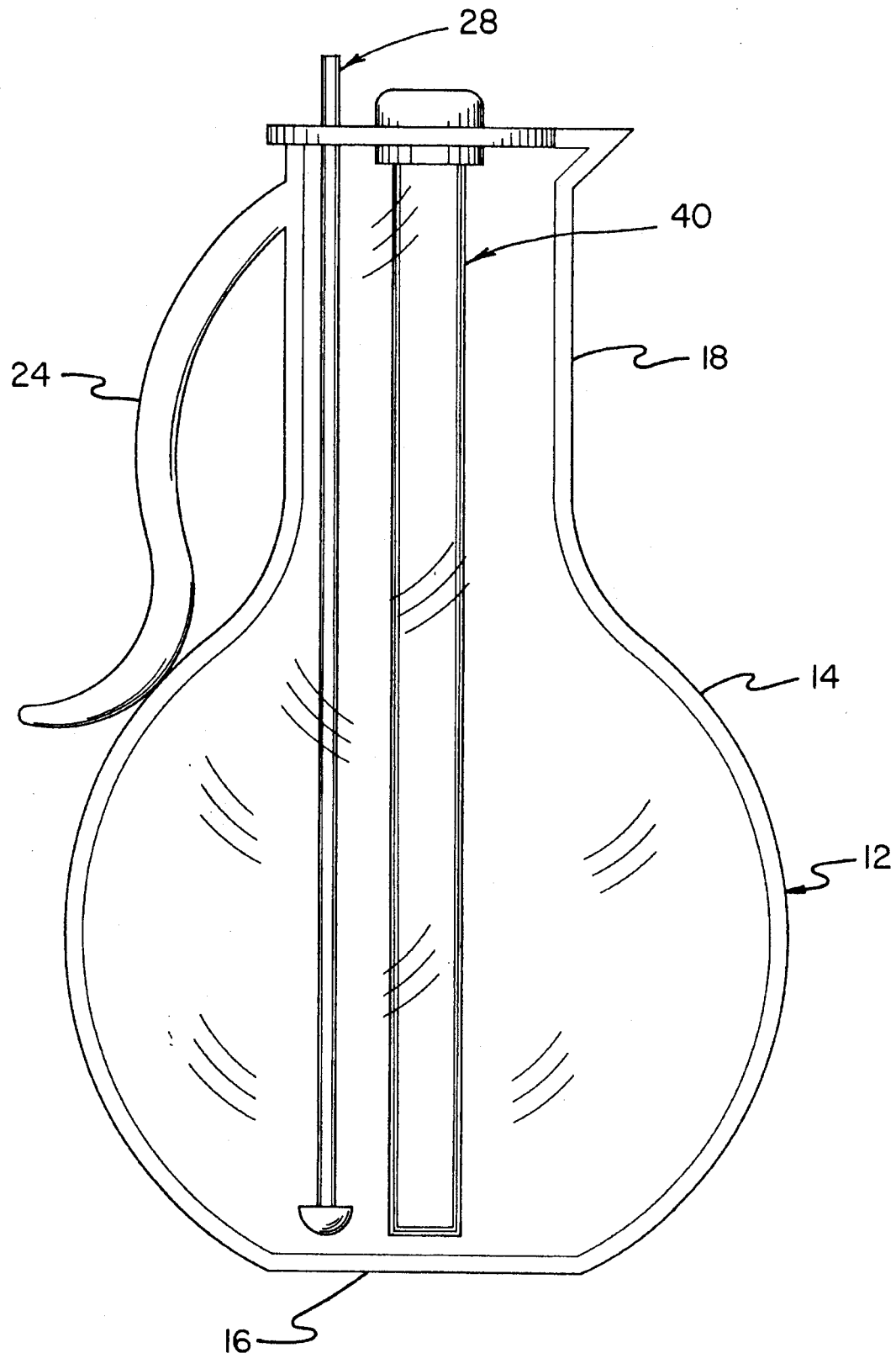
FIG. 1 is a side elevation view of a refrigerated container according to the present invention.

With reference now to the drawings, and in particular to FIGS. 1–6 thereof, a new refrigerated container embodying the principles and concepts of the present invention and generally designated by the reference numeral 10 will be described.

Figure 2:
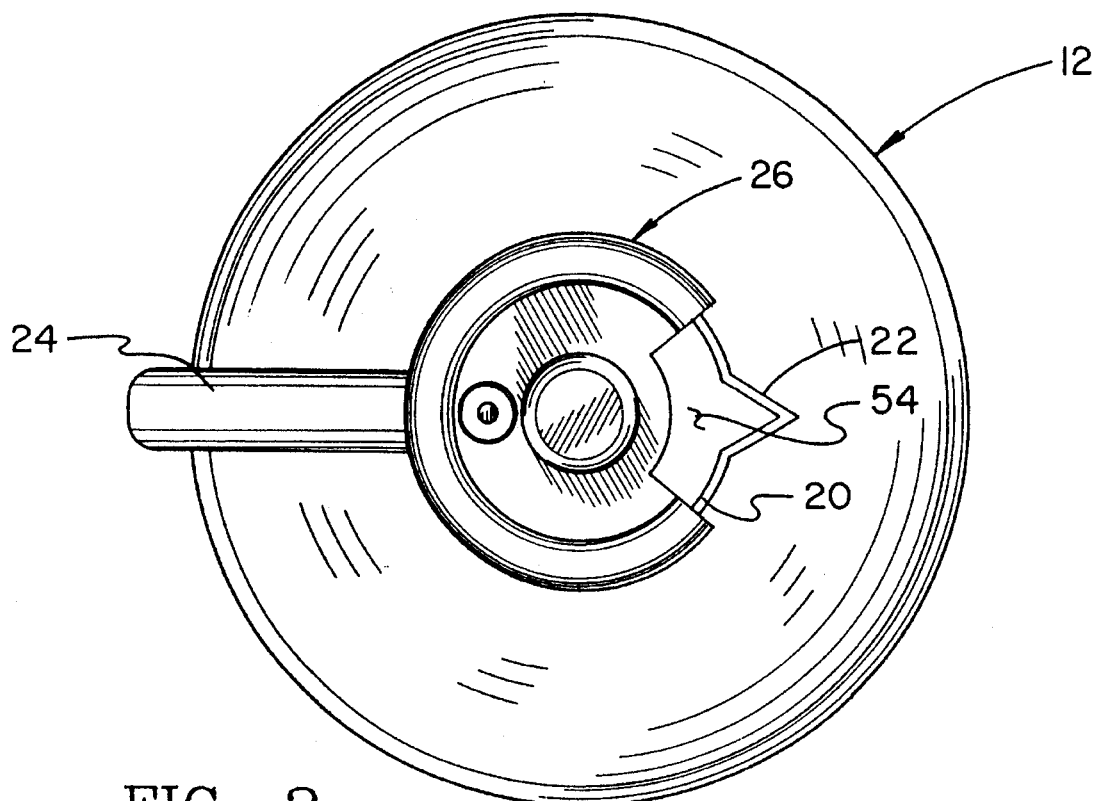
FIG. 2 is a top plan view thereof.
Figure 3:
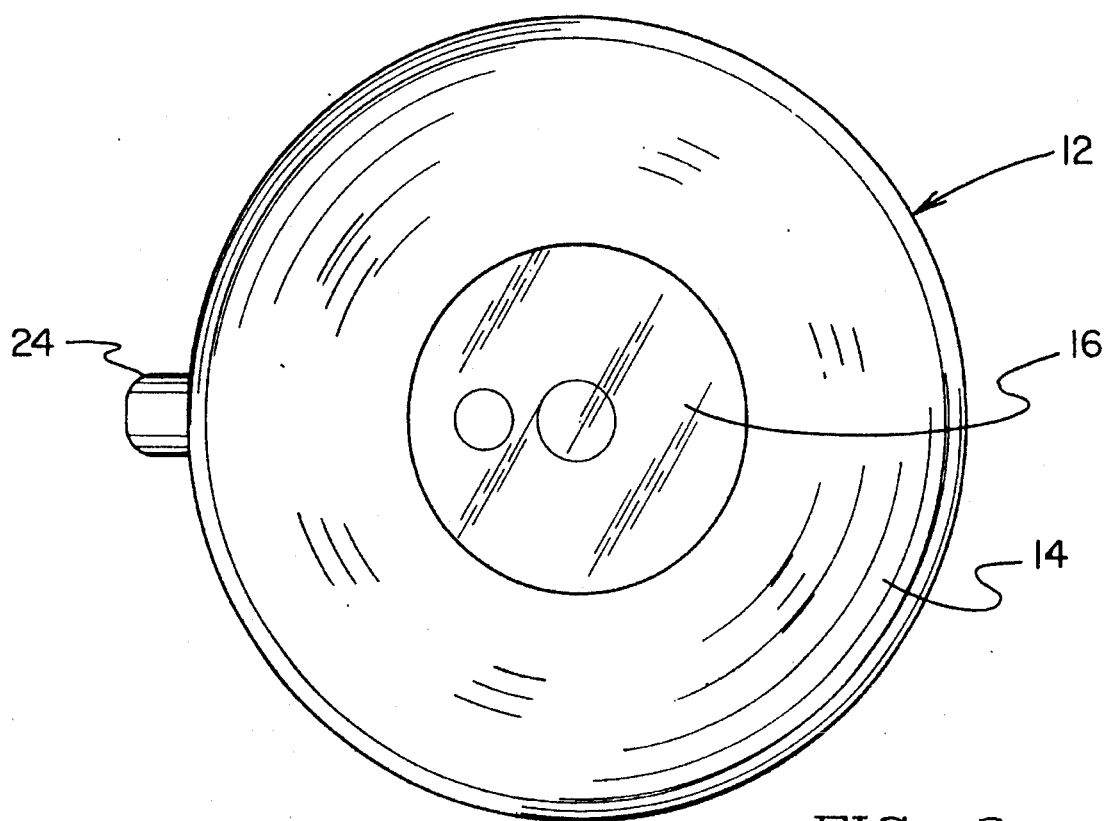
FIG. 3 is a bottom plan view of the invention.

More specifically, it will be noted that the refrigerated container 10 comprises a pitcher means 12 for receiving and storing a fluid, such as a beverage or the like. To this end, the pitcher means 12 comprises a substantially spherical main body 14 having a hollow interior within which the beverage can be positioned. The main body 14 is shaped so as to define a flat bottom 16 which permits a positioning of the pitcher means 12 atop an unillustrated support surface. The main body 14 continues into a reduced neck portion 18 which terminates at an upper annular edge 20, as shown in FIGS. 2 and 3. The annular edge 20 is shaped so as to define a pouring lip 22 at a front of the pitcher means 12, with a handle 24 extending from the reduced neck 18 at a rear of the pitcher means. The handle means 24 is operable to be grasped and manipulated by an individual to effect movement of the pitcher means 12 and subsequent dispensing of the beverage contained therein through the pouring lip 22 by a tilting or rotating of the main body 14 about a horizontal axis. A lid 26 extends across an upper opening of the reduced neck 18 and is frictionally engaged to the upper annular edge

20 so as to be removably coupled thereto. By this structure, the lid 26 can be selectively removed to facilitate positioning of the beverage within the pitcher means 12.

As best illustrated in FIGS. 1 and 4, the present invention 10 includes a stirring means 28 for manually agitating the beverage contained within the pitcher means 12. To this end, the lid 26 includes a through-extending aperture 30 (see FIG. 6) through which the stirring means 28 extends. The stirring means 28, as shown in FIG. 4, comprises an elongated rod 32 slidably received through the aperture 30 in the lid 26 such that an upper end of the elongated rod projects beyond the lid for manipulation by the individual. An agitator 34 is secured to a lower distal end of the elongated rod 32 and extends into contact with the beverage when positioned within the pitcher means 12 to effect agitation of the beverage. To this end, the agitator 34 is shaped so as to define an arcuate lower surface 36 and a flat upper surface 38. The arcuate lower surface 36 and the flat upper surface 38 cooperate to define the substantially hemi-spherical shape of the agitator 34, with the flat upper surface 38 being joined to lower distal end of the elongated rod 32. By this structure, an upward movement of the elongated rod 32 through the aperture 30 of the lid 26 will move the agitator 34 through the beverage with the flat upper surface 38 operating as a leading edge of the agitator, and the arcuate lower surface 36 operating as a trailing edge of the agitator, thereby providing a first degree of agitation relative to a predetermined speed of the movement of the agitator 34 through the beverage. When the elongated rod 32 is moved downwardly relative to the illustration shown in FIG. 1, the arcuate lower surface 36 of the agitator 34 operates as a leading surface, with the flat upper surface 38 functioning as a trailing surface of the agitator 34, thereby providing a second degree of agitation of the beverage when the agitator 34 is moved at the same predetermined speed. Thus, the specific shape of the agitator 34 provides for a plurality of disparate degrees of agitation for a single speed of movement of the elongated rod relative to a direction of motion of the agitator.

Figure 6:
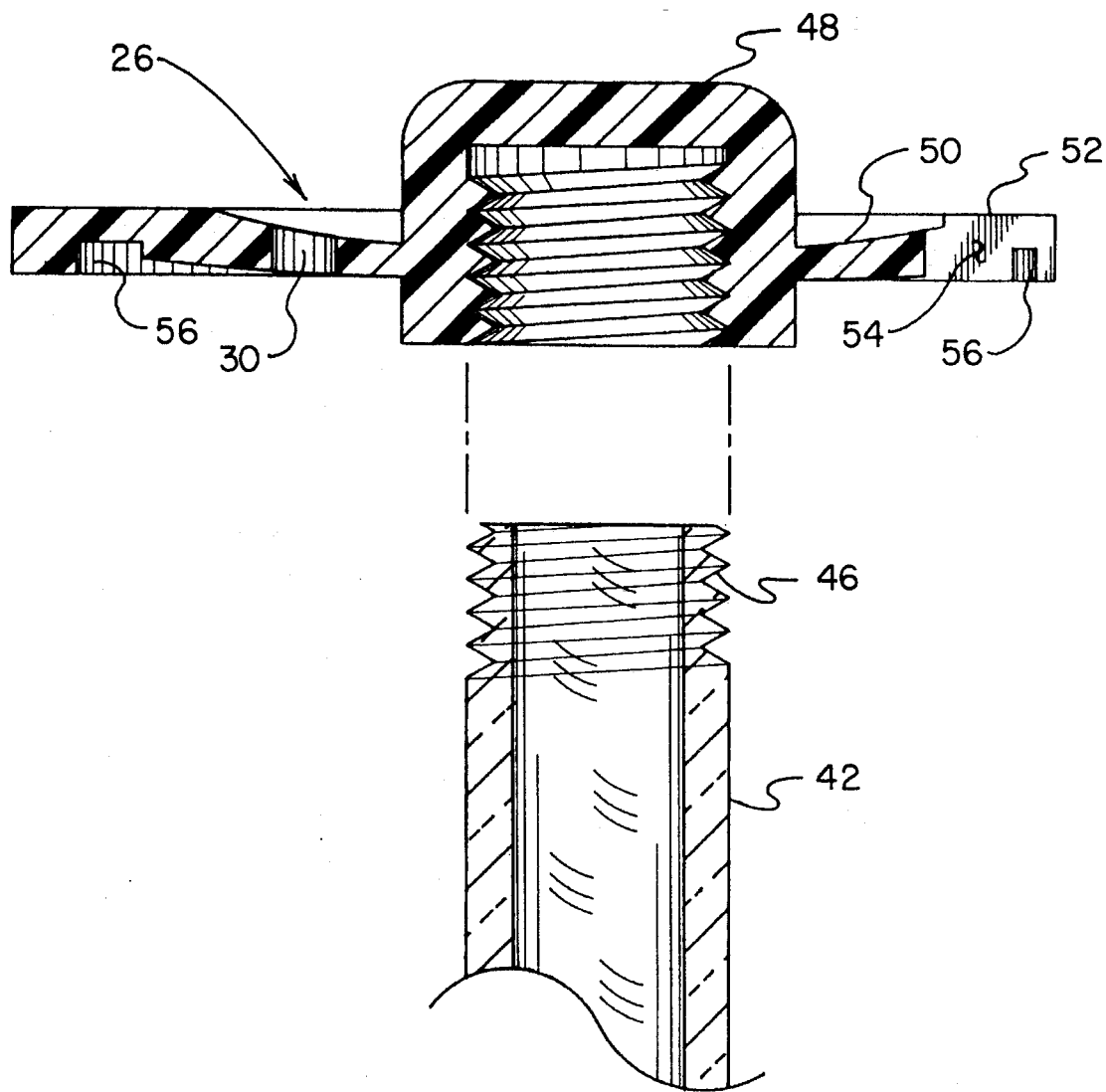
FIG. 6 an enlarged cross sectional illustration taken along line 6—6 of FIG. 5.

As best illustrated in FIGS. 5 and 6, a cooling means 40 for cooling the beverage contained within the pitcher means 12 is provided and preferably comprises an elongated cylinder 42 having a closed lower end 44 and a threaded neck 46 at an upper end thereof. The cylinder 42 is substantially hollow and is operable to receive a plurality of ice cubes therewithin. The threaded neck 46 is engagable to the threaded interior of a cap 48 extending through a center of the lid 26. By this structure, the cylinder 42 of the cooling means 40 is supported by the lid 26, as shown in FIG. 1, such that the closed lower end 44 is spaced from the flat bottom 16. By this structure, a placement of a plurality of ice cubes within the cylinder 42 will effectively cool the beverage contained within the pitcher means 12 without requiring a direct immersion of the ice cubes within the beverage which could result in dilution of such beverage.

With continuing reference to FIG. 6, it can be shown that the lid 26 more specifically comprises a center member 50 through which the cap 48 integrally projects. A reinforced perimeter 52 extends circumferentially about the center member 50 and is shaped so as to define a pouring lip cut out 54 which permits dispensing of the beverage from the pitcher means 12 with the lid attached across the upper annular edge 20 thereof. To effect securement of the lid 26 across the upper annular edge 20 as described above, the reinforced perimeter 52 includes an annular groove 56 which receives and frictionally engages the upper interior and exterior surface of the reduced neck 18, as well as the upper annular edge 20 thereof.

In use, the refrigerated container 10 provides a convenient means for rapidly cooling a beverage placed within the pitcher means 12. To this end, one can simply position a plurality of ice cubes within the cylinder 42, attach the cylinder 42 to the cap 48 of the lid 26, position the elongated rod 32 of the stirring means 28 through the aperture 30, and position the lid across the open end of the reduced neck 18, as shown in FIG. 1. Thus, as the beverage is being cooled by the cooling means 40 an individual may simultaneously effect agitation of the beverage through a manual manipulation of the stirring means 28 as described above. Subsequent to consumption or dispensing of the beverage from the pitcher means 72, the entire device 10 may be completely disassembled for cleaning or the like.

As to a further discussion of the manner of usage and operation of the present invention, the same should be apparent from the above description. Accordingly, no further discussion relating to the manner of usage and operation will be provided.

with respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A refrigerated container comprising:

a pitcher means for receiving and storing a beverage;

a cooling means for cooling said beverage contained within said pitcher means;

a stirring means movably coupled to said pitcher means for manually agitating said beverage contained within the pitcher means;

wherein said pitcher means comprises a substantially spherical main body having a hollow interior within which said beverage can be positioned, said main body being shaped so as to define a flat bottom which permits a positioning of said pitcher means atop a support surface, said main body continuing into a reduced neck portion terminating at an upper annular edge, said upper annular edge being shaped so as to define a pouring lip at a front of said pitcher means; and a handle extending from said reduced neck at a rear of said pitcher means, said handle means being operable to be grasped and manipulated by an individual to effect movement of said pitcher means and dispensing of said beverage contained therein through said pouring lip by a tilting of said main body about a horizontal axis;

a lid extends across an upper opening of said reduced neck and frictionally engaged to said upper annular edge thereof so as to be removably coupled thereto;

wherein said lid includes a through-extending aperture through which said stirring means extends, said stirring means comprising an elongated rod slidably received through said aperture in said lid such that an upper end of said elongated rod projects beyond said lid for manipulation by said individual; an agitator secured to a lower distal end of said elongated rod and positioned for extending into contact with said beverage when said beverage is positioned within said pitcher means to effect agitation of said beverage;

wherein said cooling means comprises an elongated cylinder having a closed lower end and a threaded neck at an upper end thereof, said cylinder being substantially hollow and operable to receive a plurality of ice cubes therewithin, said threaded neck being engagable to an interior of said lid such that said cylinder is supported by said lid so as to position said closed lower end thereof into said pitcher means for immersion within said beverage, wherein a placement of a plurality of ice cubes within said cylinder will effect cooling of said beverage;

wherein said agitator is shaped so as to define an arcuate lower surface and a flat upper surface, said arcuate lower surface and said flat upper surface cooperating to define a substantially hemi-spherical shape of said agitator, with said flat upper surface being joined to said lower distal end of said elongated rod, wherein an upward movement of said elongated rod through said aperture of said lid will move said agitator through said beverage with said flat upper surface operating as a leading edge of said agitator, and said arcuate lower surface operating as a trailing edge of said agitator, thereby providing a first degree of agitation relative to a predetermined speed of said movement of said agitator through said beverage, and further wherein a downward movement of said elongated rod through said aperture of said lid will move said agitator through said beverage with said arcuate lower surface of said agitator operating as a leading surface, and said flat upper surface thereof functioning as a trailing surface of said agitator, thereby providing a second degree of agitation of said beverage, wherein said first degree of agitation differs from said second degree of agitation relative to a constant predetermined speed of motion of said agitator.

2. A refrigerated container comprising:

a pitcher means for receiving and storing a beverage, said pitcher means comprising a substantially spherical main body having a hollow interior within which said beverage can be positioned, said main body being shaped so as to define a flat bottom which permits a positioning of said pitcher means atop a support surface, said main body continuing into a reduced neck portion terminating at an upper annular edge, said upper annular edge being shaped so as to define a pouring lip at a front of said pitcher means; and a handle extending from said reduced neck at a rear of said pitcher means, said handle means being operable to be grasped and manipulated by an individual to effect movement of said pitcher means and dispensing of said beverage contained therein through said pouring lip by a tilting of said main body about a horizontal axis;

a lid extends across an upper opening of said reduced neck and frictionally engaged to said upper annular edge thereof so as to be removably coupled thereto, said lid comprising a center member having a through-extending aperture; a cap integrally formed into said center member and projecting into said pitcher means, said cap having internal threads; a reinforced perimeter extending circumferentially about said center member shaped so as to define a pouring lip cut out which permits dispensing of said beverage from said pitcher means with said lid attached across said upper annular edge thereof, said reinforced perimeter further including an annular groove which receives and frictionally engages upper interior and exterior surfaces of said reduced neck and said upper annular edge thereof;

a cooling means for cooling said beverage contained within said pitcher means, said cooling means comprising an elongated cylinder having a closed lower end and a threaded neck at an upper end thereof, said cylinder being substantially hollow and operable to receive a plurality of ice cubes therewithin, said threaded neck being engagable to an interior of said lid such that said cylinder is supported by said lid so as to position said closed lower end thereof into said pitcher means for immersion within said beverage, wherein a placement of a plurality of ice cubes within said cylinder will effect cooling of said beverage;

a stirring means movable coupled to said pitcher means for manually agitating said beverage contained within the pitcher means, said stirring means comprising an elongated rod slidably received through said aperture in said lid such that an upper end of said elongated rod projects beyond said lid for manipulation by said individual; an agitator secured to a lower distal end of said elongated rod and positioned for extending into contact with said beverage when said beverage is positioned within said pitcher means to effect agitation of said beverage, said agitator being shaped so as to define an arcuate lower surface and a flat upper surface, said arcuate lower surface and said flat upper surface cooperating to define a substantially hemi-spherical shape of said agitator, with said flat upper surface being joined to said lower distal end of said elongated rod, wherein an upward movement of said elongated rod through said aperture of said lid will move said agitator through said beverage with said flat upper surface operating as a leading edge of said agitator, and said arcuate lower surface operating as a trailing edge of said agitator, thereby providing a first degree of agitation relative to a predetermined speed of said movement of said agitator through said beverage, and further wherein a downward movement of said elongated rod through said aperture of said lid will move said agitator through said beverage with said arcuate lower surface of said agitator operating as a leading surface, and said flat upper surface thereof functioning as a trailing surface of said agitator, thereby providing a second degree of agitation of said beverage, wherein said first degree of agitation differs from said second degree of agitation relative to a constant predetermined speed of said motion of said agitator.

\* \* \* \* \*